United States Patent

Pirolli

[11] 4,449,653
[45] May 22, 1984

[54] BICYCLE STORAGE TRUNK

[76] Inventor: Robert J. Pirolli, 6500 Torresdale Ave., Philadelphia, Pa. 19135

[21] Appl. No.: 329,628

[22] Filed: Dec. 11, 1981

[51] Int. Cl.³ ............................................. B62J 7/02
[52] U.S. Cl. ................... 224/35; 224/32 R; 224/39; 224/42.44
[58] Field of Search ............... 224/35, 30 R, 42.46 R, 224/32 R, 39, 42.45 R, 36, 42.41, 42.44, 42.21, 42.23, 282; 220/23; 280/202, 289 A, 289 R

[56] References Cited

U.S. PATENT DOCUMENTS

| | | | |
|---|---|---|---|
| 522,186 | 7/1894 | Andrews | 224/35 |
| 544,640 | 8/1895 | Leonard | 224/35 |
| 595,959 | 12/1897 | Marshall, Jr. | 224/35 |
| 603,018 | 4/1898 | Beck | 224/35 |
| 618,612 | 1/1899 | Parsons | 224/35 |
| 1,090,532 | 3/1914 | Harley | 224/35 |
| 2,545,959 | 3/1951 | King | 220/331 |
| 2,840,287 | 6/1958 | Stevens | 224/35 |
| 3,777,955 | 12/1973 | Davies | 224/35 |
| 3,837,546 | 9/1974 | Westermann | 224/35 |
| 3,945,544 | 3/1976 | Walker et al. | 224/32 R |
| 4,079,872 | 3/1978 | Halter | 224/35 |
| 4,085,961 | 4/1978 | Brown | 224/282 |
| 4,193,525 | 3/1980 | Sommers | 224/35 |

FOREIGN PATENT DOCUMENTS

| | | | |
|---|---|---|---|
| 595703 | 10/1932 | Fed. Rep. of Germany | 224/35 |
| 420762 | 3/1947 | Italy | 224/35 |
| 29065 | of 1911 | United Kingdom | 224/35 |
| 700931 | 12/1953 | United Kingdom | 224/35 |

*Primary Examiner*—Allan N. Shoap
*Assistant Examiner*—Robert Petrik
*Attorney, Agent, or Firm*—Caesar, Rivise, Bernstein & Cohen, Ltd.

[57] ABSTRACT

A bicycle storage trunk to be attached to the frame of a closed frame bicycle. The storage trunk which includes a hinged door is pivotably mounted to the bicycle frame such that when the trunk is in a first position the door is precluded from opening and when the trunk is in a second position the door may be opened, thus enabling one to have access into the trunk. The device is designed to be locked to the bicycle frame in the first position in order to prevent the contents of the trunk from being stolen at such times that the bicycle may be left unattended. The trunk is constructed having a solid metal housing, so that the trunk may support and house relatively heavy objects. The interior of the trunk is covered by a soft layer of foam to prevent the contents therein from rattling or from being damaged by the metal housing.

2 Claims, 6 Drawing Figures

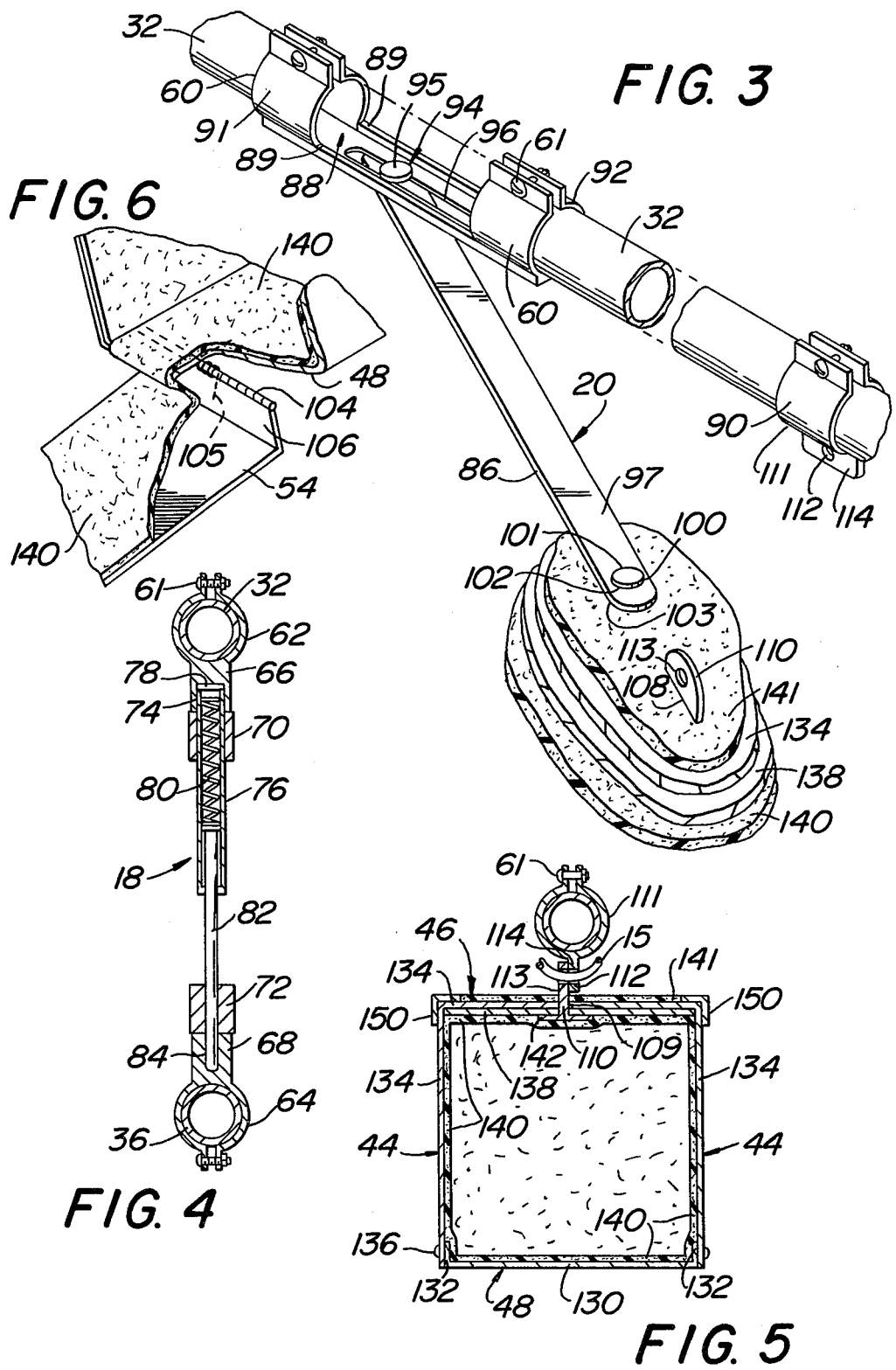

BICYCLE STORAGE TRUNK

BACKGROUND OF THE INVENTION

This invention relates generally to bicycle accessories, and more particularly to luggage carrying devices for bicycles.

Prior art, luggage carrying devices which attach to a bicycle come in a wide variety of designs. These devices include saddle bags which hang from the bicycle seat, spring operated luggage racks which attach above the rear wheel of the bicycle and wire framed, as well as other types, of carrying baskets which either attach to the handlebars or are suspended from some other portion of the bicycle.

Although these prior art devices are to a certain extent an effective means for carrying various types of items while riding a bicycle, these devices all have some significant limitations.

One major limitation common to these devices is that they generally fail to provide adequate means for preventing the contents being carried therein from being stolen should the bicycle be left unattended.

Furthermore, many of these prior art devices fail to protect their contents from being directly exposed to the elements. Still further, these devices are often an unsatisfactory means for transporting heavy objects, particularly those objects which have a tendency to rattle.

OBJECTS OF THE INVENTION

Accordingly, it is a general object of the instant invention to provide a device which overcomes the disadvantages inherent in the prior art bicycle luggage carrying devices.

It is another object of the instant invention to provide a device which enables a bicycle rider to carry on his bicycle some rather heavy objects.

It is a further object of the instant invention to provide a storage trunk which enables a bicycle rider to carry and secure to a bicycle by locking means, valuable as well as other objects.

It is still a further object of the instant invention to provide a bicycle trunk which is releasably securable to a conventional bicycle by means which do not require the bicycle to be altered in any manner.

It is still a further object of the instant invention to provide a bicycle storage trunk which is of durable construction, can readily be attached to a conventional bicycle, and is fairly inexpensive to produce.

SUMMARY OF THE INVENTION

These and other objects of the instant invention are achieved by providing a storage trunk for a closed frame bicycle which includes a top tube, a down tube and a seat tube. The storage trunk comprises an enclosed housing having means for gaining access into the enclosed housing. The trunk further includes means for its being pivotably attached to the bicycle frame such that in a first position the trunk is aligned with the frame so as to preclude one from having access into the housing and in a second position the trunk is at a predetermined angle away from the frame, enabling one to have access into the housing. Also included is means for locking the trunk in the first position.

DESCRIPTION OF DRAWING

FIG. 3 is an enlarged perspective view of a portion of the storage trunk of this invention, partially broken away;

FIG. 4 is an enlarged sectional view taken along line 4—4 of FIG. 1;

FIG. 5 is an enlarged sectional view of the storage trunk of this invention taken along line 5—5 of FIG. 1; and, FIG. 6 is an enlarged perspective view of a portion of the storage trunk of this invention, partially broken away and partially in section.

DETAILED DESCRIPTION OF THE PREFERRED EMBODIMENT

Figure 1:
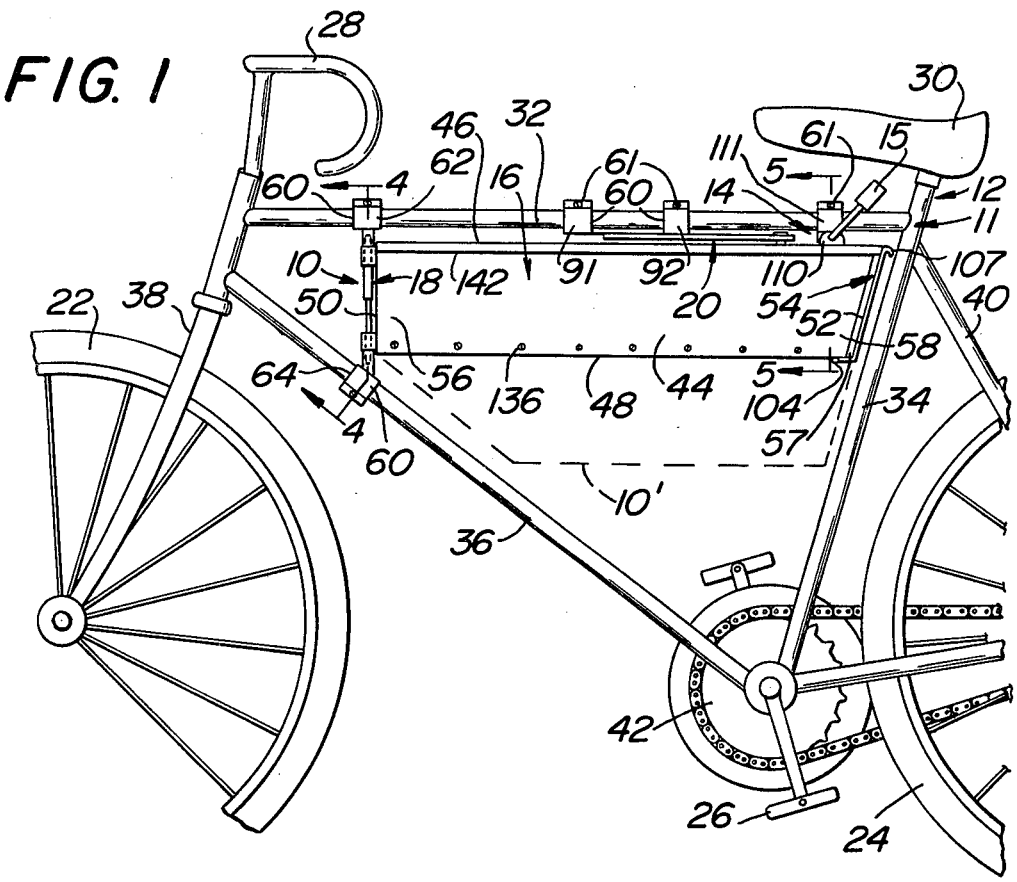
FIG. 1 is a side elevational view of the storage trunk of this invention, shown on a portion of a conventional, closed frame bicycle to which it is attached.

Referring now to the various figures of the drawing wherein like reference characters refer to like parts, there is generally shown at 10 in FIG. 1 a storage trunk constructed in accordance with this invention. The trunk 10 is designed to be releasably secured to a closed frame (men's style) bicycle 12 of conventional construction.

The storage trunk 10 is useful for enabling a bicycle rider to carry and secure to his bicycle by locking means 14 valuable as well as other objects (e.g., clothing, tools and chains).

As shown in FIG. 1, the storage trunk 10 basically comprises a housing 16, a rod assembly 18 and an arm assembly 20. The bicycle 12 includes a front wheel 22, a rear wheel 24, pedals 26, handlebars 28, a seat 30 and a sprocket and chain assembly 42. The bicycle 12 also includes a frame 11 which comprises a top tube 32, a seat tube 34, a down tube 36, a front fork 38 and a rear fork 40.

In FIG. 1, the storage trunk 10 is shown attached to the bicycle frame 11 between the top tube 32 and the down tube 36.

Although the size of the present embodiment of the bicycle trunk of the instant invention is shown at 10 in FIG. 1, the storage trunk 10' which is shown in phantom in FIG. 1 illustrates the possibility of constructing an enlarged version of the present embodiment of the invention 10. It should be pointed out however, that the trunk should preferably be no wider than 4 inches (10.2 cm) so as not to interfere with the rider's leg movements while pedaling.

Moreover, although the present embodiment of the storage trunk 10 is largely constructed of steel, an alternative embodiment of the invention would entail a housing constructed of a durable, high strength, moldable plastic, such as acrylonitrile-butadiene-styrene (ABS).

Figure 2:
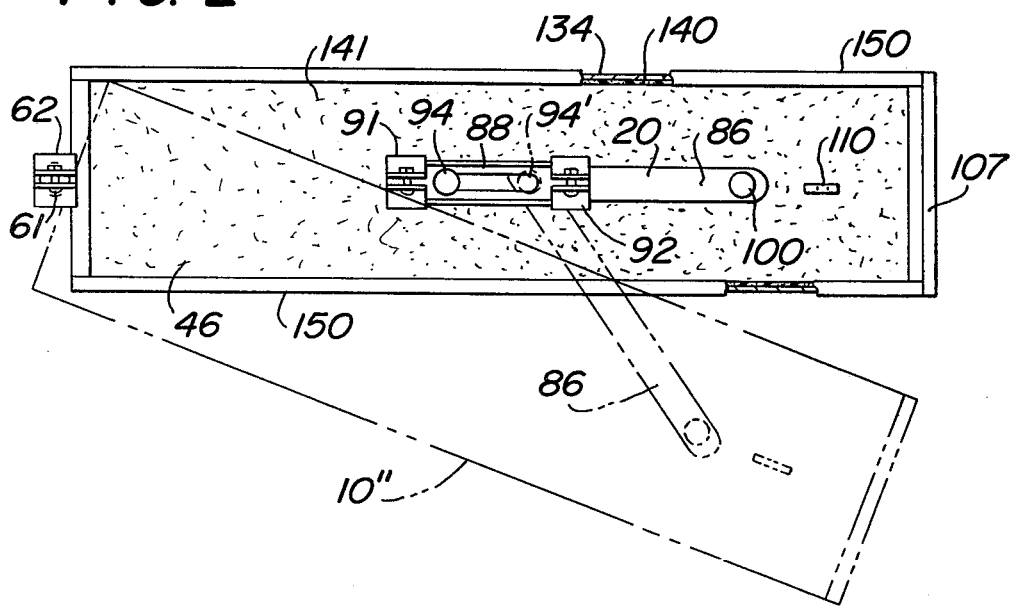
FIG. 2 is an enlarged top plan view of the device of this invention, partially in section.

The housing 16 of the instant invention (as shown in FIGS. 1, 2 and 5) includes a pair of parallel side walls 44, top and bottom walls 46 and 48, respectively, an end wall 50 and a front opening 52. The top and bottom walls are disposed parallel to each other and the end wall 50 is disposed perpendicular to the side, top and bottom surfaces. A door 54 is pivotably attached to the bottom wall 48 adjacent the front opening 52, such that in a closed position the door covers the opening 52, thus producing a completely enclosed housing 16. The top wall 46 is slightly longer than the bottom wall 48. As a result, the front opening 52 and the door 54, when in a closed position, form an angle relative to the top wall 46, thus enabling the periphery of that portion of the trunk 10 to generally conform to the shape of a portion of the bicycle frame 11, and more particularly, to the angle formed by the top tube 32 intersecting with the seat tube 34.

To that end, the device 10 is mounted to the bicycle 12 such that the front opening 52 of the device 10 is positioned to be adjacent the bicycle's seat tube 34, while the end plate 50 is positioned toward the front end of the bicycle.

The rod assembly 18 serves to pivotably secure the front portion 56 of the storage trunk 10 to the top tube 32 and to the down tube 36 of the bicycle 12.

The arm assembly 20 secures the rear portion 58 of the housing 16 to the top tube 32 of the bicycle frame 11 in a manner which enables the trunk to rotate about the axis of the rod assembly 18.

As mentioned above, rotation of the device 10 is necessary in order to enable one to gain access into the inside portion of the trunk's housing 16. To that end, as can be seen in FIG. 1, when the device 10 is aligned with the bicycle frame 11, the door 54 is positioned to be in very close proximity to the seat tube 34, thus preventing the trunk's door 54 from opening. As should be obvious, access to the inside of the trunk 10 is effectuated by rotating the trunk about the rod assembly 18 to a point where the door 54 can be opened without interference from the seat tube 34.

Referring to FIG. 3, the arm assembly 20 basically comprises an arm 86, a slotted bar 88 and clamping means 60. The arm assembly's clamping means 60 include a pair of C-clamps 91 and 92 which are integrally formed from the slotted bar 88 and operate to clampingly engage the top tube 32 of the bicycle frame 11. The slotted bar 88 is an elongated, generally planar steel member with an upwardly extending lip 89 formed along each of its two longitudinal edges for engaging a portion of the peripheral surface of the tubular bicycle frame 11, and an elongated slot 96 running longitudinally through the center of the bar for most of its length. The arm 86 is constructed as a generally planar, elongated steel member which is pivotably and slidably attached to the slotted bar 88 by means of a pin 94 which is pivotably and slidably mounted within the slot 96 of the slotted bar 88. The head 95 of the pin is of a sufficiently large diameter to keep the pin 94 from pulling through the slot 96. As a result, the arm 86 is free to both pivot and slide relative to the slotted bar 88.

The other end 97 of the arm 86 is pivotably attached to the housing 16 of the trunk by means of a second pin 100 which is inserted through a hole 102 in the arm 86 and attached to the top wall 46 of the housing. The pin 100 includes a head 101 whose diameter is slightly larger than the diameter of the hole 102, thus enabling the pin to be secured within the hole. The other end of the pin 100 is secured to the housing 16 in a manner which shall be discussed below.

Referring to FIG. 4, the rod assembly 18 includes a pair of C-clamps 62 and 64, a dependent boss 66 which is integrally attached to the clamp 62, and an upstanding boss 68 which is integrally attached to the clamp 64. Adjacent the dependent boss 66 is a sleeve 70, and adjacent the upstanding boss 68 is a second sleeve 72.

The rod assembly 18 is secured to the end or front wall 50 of the housing by sleeves 70 and 72, which are welded to the plate 50 such that the assembly will be situated along the central vertical axis line of the wall 50. As should be appreciated from the foregoing, the trunk 10, as a result of its being attached to the sleeves 70 and 72, is thus enabled to rotate along with the sleeves.

The dependent boss 66 includes a bore 74 which is both aligned with and approximately of the same diameter as the hollow center of the sleeve 70. Fitted through the hollow sleeve 70 and into this hole is a hollow circular tube 76. Secured within the top end of the tube 76 is a pin 78. A compression spring 80 within tube 76 abuts the pin 78. The other end of the spring 80 abuts a rod 82, one end of which is slidably mounted within the tube 76. The other end of the rod 82 is received in boss 68, in a manner to be discussed below.

The upstanding boss 68 also contains a bore 84. The bore 84 is of approximately the same diameter as the hollow center of the sleeve 72, and is aligned with this hollow center portion as well. The bottom end of the rod 82 is fitted through the sleeve 72 and into the bore 84.

A portion of the rod 82 is able to slidably move within the tube 76, against the urging of spring 80.

In attaching the storage trunk of this invention to the frame of the bicycle, the clamps 62 and 64 are placed on their respective frame portions 32 and 36. The clamps are positioned on the frame portions so as to enable the door 54 of housing 16 to be adjacent frame portion 34. Once the clamps 62 and 64 are in their set positions, and secured in place, the rod assembly 18 is inserted through sleeves 70 and 72 on housing 16. Thereafter, the rod 82 is moved vertically upward, thereby compressing spring 80. When in this compressed condition, the tube 76 can be inserted in bore 74 of boss 66 and the rod 82 can be aligned with bore 84 in boss 68. By releasing the compression on the spring, the rod 82 will snap into bore 84. Thereafter, the housing 16 is freely rotatable about rod assembly 18, through sleeves 70 and 72. In view of the spring mounting of the rod assembly the storage trunk of this invention can be used on any conventional closed frame bicycle, regardless of whether the frame is 24, 26 or 27 inches (61.0, 66.0 and 68.6 cm.). Thus, the spring assembly adapts the invention to use on various size bicycle frames.

As can best be appreciated by observing the position defined by phantom lines 10" in FIG. 2, rotation of the trunk 10 is made possible as a result of its being attached to the bicycle 12 at one end by the pivotable rod assembly 18 and at its other end by the pivotable and slidable arm assembly 20. It should be pointed out that the rotation of the trunk 10 is not unlimited inasmuch as it is only capable of rotating to the postion shown at 10". As should be appreciated from FIG. 2, the pin 94 is shown both at a first postion and also at a second position, (the second position is shown in phantom lines at 94'). The second position of the pin at 94' corresponds with the trunk having been rotated to the position illustrated by phantom lines 10". At this position the pin 94' is adjacent one end of the slot 96, and thus, the housing 16 is precluded from rotating any further in that direction.

Moreover, at the position 10", the door 54 is sufficiently angled from the bicycle frame 11 to allow one to readily gain access into the housing 16.

Referring to FIGS. 1 and 6, the door 54 of the device is hinged to the trunk 10 by means of a spring loaded hinge 104 which operates to pivotably connect the bottom edge of the door to the bottom 48 of the trunk at a position adjacent the trunk's front opening 52. The hinge 104 is attached to a flange 106 of the door 54, and to the bottom wall 48.

When the door 54 is pivoted relative to the bottom wall 48, it is pivoted against the urging of the spring 105 of the hinge 104. The spring can be an over-the-center spring, whereby the door will remain open once it is pivoted downwardly. When the door is lifted, the spring will return the door to its closed condition. As seen in FIG. 1, the spring holds the door 54 adjacent opening 52 in the closed condition. The door 54 includes a lip 107 (FIG. 1) which is used to facilitate the opening of the door.

As seen in FIG. 3, the locking means 14 includes a holed tab member 110, a conventional bicycle lock 15 (FIG. 1) and a holed C-clamp 111. The tab member 110 extends upwardly from a point which is both along the longitudinal center line of the horizontal top wall 46 of the trunk and also generally adjacent the door 54. The holed C-clamp 111 clampingly engages the top tube 32 of the bicycle at a position, such that a hole 112 through a flanged portion 114 of the clamp is aligned with the hole 113 in the tab member when the trunk 10 is in a position of alignment with the bicycle frame 11. In order to lock the trunk 10 in the aligned position, the loop of lock 15 is placed through the hole 113 in the tab member, through the hole 112 in the C-clamp 111 and then around the bicycle frame's top tube 32 before locking it in place.

As shown in FIG. 1, the tab member 110 also cooperates with the flanged end 114 of the clamp 111 to prevent the trunk from rotating past the point where the trunk 10 is in a position of alignment with the bicycle frame 11, in the direction opposite to the direction the trunk normally rotates (the normal direction of rotation is shown in FIG. 2 at 10").

As shown in FIG. 5, the housing of the device comprises several different layers of material. The bottom wall 48 includes a stainless steel bottom plate 130. The bottom plate 130 has a pair of vertical flanges 132, each of which extend upwardly for the entire length of a respective longitudinal edge of the bottom plate 130. The two side walls 44 and the top surface 46 of the device are in part, constructed of two L-shaped stainless steel plates 134 which abut each other and are soldered together along the longitudinal center line of the top surface. Each L-shaped plate 134 is also attached to a respective flanged portion 132 of the bottom plate 130 by means of self-tapping machine screws 136. Along the top wall 46 and beneath the L-shaped plates 134 (i.e., toward the inside of the trunk), is a stainless steel reinforcing plate 138. The reinforcing plate 138 affords additional strength to the upper wall 46 of the trunk and is attached to the L-shaped plates by means of self-tapping machine screws 136.

A soft layer of foam insulation 140 is adhesively attached to the six inside surfaces (including the door 54) comprising the housing 16 of the trunk 10 to prevent the contents therein from either rattling or being damaged upon hitting against the stainless steel plates.

Furthermore, the external or outer portion of the top surface 46 of the device is covered with a decorative layer of foam 141, which is also adhesively attached thereto.

As mentioned above, the upper wall 46 of the housing 16 includes a pair of holes 103 and 109 which go completely through the top surface of the housing. The pin 100 which connects the arm assembly 20 to the housing is inserted through the hole 103 and is soldered in place along the inside portion of the top surface 46 of the housing. Likewise, as shown in FIG. 5, the tab member 110 is inserted through the second hole 109 in the top surface 46 of the housing, and its integral flange 142 is soldered in place along the inside of the top surface 46.

The end plate 50 of the device is constructed of stainless steel and includes flanged edges (not shown in the drawing), which enable it to be attached to the sides, top and bottom of the housing by means of self-tapping machine screws (also not shown in the drawing).

As mentioned above, the arm assembly 20, the locking means 14 and the rod assembly 18 include and are connected to the bicycle frame 11 by clamping means 60. The clamping means 60 as shown in FIGS. 1, 3, 4 and 5, are flexible C-clamps which are capable of being stretched apart so that they may be placed around portions of the tubular frame 11 of the bicycle and then tightened in place by means of bolts and associated nuts 61. Consequently, the trunk 10 may readily be attached to or removed from a bicycle 12 without having to either disassemble a portion of the bicycle or alter the bicycle in any manner.

The device of this invention has been described as being fabricated from stainless steel. However, it can be formed from any structural material known to the art, such as non-stainless steel or aluminum. It also can be integrally molded from any durable plastic, as noted above. The shape of the device can also be modified for aesthetic or functional purposes. If desired, the side walls can be tapered toward the front of the bicycle. Additionally, decorative moldings 150 can be placed along the upper edges of the housing (FIG. 5).

The locking of the storage trunk in the position shown in FIG. 1 prevents the removal of any of the contents of the housing 16. Thus, with the trunk locked in place, any attempt to open the door 54 will result in the door's contacting frame section 34. Accordingly, the contents of the housing 16 are secure so long as the housing is locked in place. When the lock 15 is removed, the trunk can be rotated around rod assembly 18 to the position shown at 10" shown in FIG. 2. When in this position, the door 54 can be pivoted open, and the contents of the trunk can be removed.

As will be appreciated from the foregoing, the storage trunk 10 of the instant invention is relatively simple in construction, is of durable design and is a highly practical means for enabling a bicycle rider to both carry and secure valuable, heavy and other objects on a bicycle 12.

Without further elaboration, the foregoing will so fully illustrate my invention that others may, by applying current or future knowledge, readily adapt the same for use under various conditions of service.

I claim:

1. For a closed frame bicycle which includes a frame portion comprising a top tube, a down tube and a seat tube collectively defining an open space therebetween, said frame portion lying in a common plane, a storage trunk comprising an enclosed housing, entrance means for affording access into the interior of said enclosed housing, means for pivotably mounting said housing on said bicycle frame within said open space and enabling said housing to be pivoted between a first and a second position and vice versa, whereupon when said housing is in said first position said housing is disposed generally within said plane, with a part of said frame precluding access into said housing through said entrance means, and when said housing is in said second position said housing is disposed at an angle from the plane of said frame portion to expose said entrance means to enable one to have access into said housing therethrough, and means for locking said housing in said first position, wherein said housing further includes a first end and a second end such that the first end is pivotably connected to said top tube and to said down tube of said frame to enable said second end of said housing to rotate out of said common plane, and said locking means includes means for releasably securing a portion of said housing adjacent said second end, to said top tube.

2. The trunk of claim 1, wherein the means for securing said second end to said frame comprises a bar adapted to be secured on said frame, said bar having a longitudinally extending slot therein, an arm having one end pivotably connected to said bar by pin means extending through said slot, said arm having a second end pivotably connected to said housing, whereby the rotation of said housing moves said pin within said slot, thereby limiting the amount of rotation of said housing.

* * * * *